UNITED STATES PATENT OFFICE.

HENRY J. HARMS, OF ORANGE, AND GEORGE E. SMALL, OF WEST ORANGE, NEW JERSEY, ASSIGNORS TO MONOGRAM CONSTRUCTION COMPANY, OF ARIZONA.

PROCESS OF PRODUCING CONCRETE.

1,038,125.     Specification of Letters Patent.     Patented Sept. 10, 1912.

No Drawing.     Application filed July 10, 1909. Serial No. 507,005.

*To all whom it may concern:*

Be it known that we, HENRY J. HARMS and GEORGE E. SMALL, of Orange and West Orange, respectively, in the county of Essex, and in the State of New Jersey, have invented a certain new and useful Improvement in Processes of Producing Concrete, and do hereby declare that the following is a full, clear, and exact description thereof.

Our invention relates to an improvement in processes of making concrete.

Our invention relates especially to the production of concrete to be used for making buildings of large size out of a single piece of concrete, structures which are known as monolithic structures.

The details of this invention have been worked out as a result of a long series of experiments in the construction of monolithic dwellings. In constructions of this character, it is necessary, because of the large size of the structure to be poured, that the concrete be extremely fluid so that it will effectively and at all times reach every portion and crevice of the entire construction. Not only is this the case, however, but it is also extremely necessary that the concrete used be of exceptional strength, both for the purpose of resisting tensional and crushing strains. It is furthermore necessary that the entire mass of concrete be of the same strength throughout, and in order to accomplish this result it is necessary that the mixture from which the concrete is made be uniform throughout the entire body of material supplied to the structure. In order to accomplish this result, we have devised the following process:

Clay is ground to the requisite fineness, and is placed in a tank having an agitator, to which is added a minimum quantity of water. As the mixture of clay and water is being agitated, additional water is added from time to time until the body of water contains the required percentage of clay. This is determined by extracting a portion of the mixture of clay and water from time to time and testing the specific gravity of the mixture by means of a hydrometer. When the hydrometer indicates the required percentage, the mixture of clay and water is run from the tank into a second tank simultaneously with the supply to said second tank of the required proportions of cement, sand and crushed stone. The preferable proportions of the mixture in volumes are: clay .2 of one part, water 1.8 parts, cement one part, sand two parts and crushed stone three parts. The quantity of the concrete having been mixed in this manner, the same is supplied to the structure being poured, and further similar mixtures are made and supplied to the structure until the structure is entirely completed. By this method of producing the mixture, the clay which is utilized comprises only the finest particles of the body of powdered clay originally added to the body of water, the heavier and larger particles of the clay failing to become suspended in said body of water and remaining at the bottom of the mixing tank. The cement is preferably ground to a very great fineness so that at least 85 per cent. thereof can pass through a 200 mesh sieve. The particles of clay, however, being so small that they readily remain suspended in the body of water for a considerable period of time, are much smaller even than the particles of cement added. A fine grade of sand is utilized, the entire body thereof being preferably small enough to pass through a 20 mesh sieve. The stone is also ground, but only sufficiently fine to pass through a sieve having apertures $\frac{1}{8}''$ to $\frac{1}{4}''$ in diameter. It will thus be seen that the particles of stone are small, but that the particles of sand are smaller, and tend to fill in the interstices between the stone; that the particles of cement are even smaller than the particles of sand, and tend to fill in the interstices not filled by the sand, and that the particles of clay are even finer than the particles of cement, and tend to fill in the interstices which are left unfilled by the particles of cement.

The preliminary mixing of the clay with the water has a very important function in the resulting concrete, inasmuch as by this means it is insured that the clay added to the mixture comprises particles of only the very greatest fineness, and furthermore that said particles of clay will become effectively distributed throughout the entire body of the concrete, inasmuch as they are carried by the body of water as a carrier, which body of water percolates throughout the entire mass of the mixture. As a result, a very much stronger concrete is produced, a concrete that will better withstand tensile strains, owing to its great cohesion, and crushing strains, because of its density, than any other form of concrete hitherto known.

The use of very finely ground materials results in the production of a mixture of a very fluid nature, and one that will readily flow to any part of an entire building with sufficient readiness to fill every crevice. The stone is ground merely to a sufficient fineness, however, to permit it to be readily carried to all parts of the structure, while a sufficient size is used to obtain as great strength as possible.

One of the most important features of our invention is the means by which we are able to obtain an absolutely uniform mixture throughout the entire mass of concrete supplied to a particular structure. This, as described above, consists in obtaining an absolutely certain and uniform percentage of clay in the water which is added to the mixture. Where clay is added to a body of water by weight, an absolutely uniform percentage of the clay in water cannot be obtained, inasmuch as clay is very hygroscopic, and the percentage of clay in a given volume or weight thereof upon a particular day varies greatly, according to the atmospheric conditions. By our method, on the other hand, the quantity of water present in a particular body of clay is entirely immaterial inasmuch as the percentage of clay to water is determined after the clay has been added to the body of water.

While we have described our invention above in detail, we wish it to be understood that many changes can be made therein without departing from the spirit thereof.

We claim:

1. The process of the character described, which comprises making a fluent emulsion of clay and water containing a sufficient amount of clay to decrease the voids in the resulting concrete, and adding said mixture to a quantity of cement and sand.

2. The process of the character described, which comprises making a fluent emulsion of clay and water containing a sufficient amount of clay to decrease the voids in the resulting concrete, and adding said mixture to a quantity of cement, sand and crushed stone.

3. The process of the character described, which comprises making a mixture of clay and water, and adding said mixture to a quantity of cement and sand, the particles of clay being finer than the particles of cement.

4. The process of the character described, which comprises making a mixture of clay and water, and adding said mixture to a quantity of cement, sand and crushed stone, the particles of clay being finer than the particles of cement.

5. The process of the character described, which comprises grinding one part of clay, mixing the same with water until the proper percentage is obtained, mixing the same with five parts of cement, ten parts of sand and fifteen parts of crushed stone, the clay, cement, sand and crushed stone being coarser than one another in the order stated.

6. The process of the character described, which comprises the mixing of one part of clay with a body of water and then adding the mixture to five parts of cement, ten parts of sand and fifteen parts of crushed stone.

In testimony that we claim the foregoing we have hereunto set our hands.

HENRY J. HARMS.
GEORGE E. SMALL.

Witnesses:
A. NEWCOMB,
G. B. PRINDLE.

Copies of this patent may be obtained for five cents each, by addressing the "Commissioner of Patents, Washington, D. C."